Patented Aug. 6, 1929.

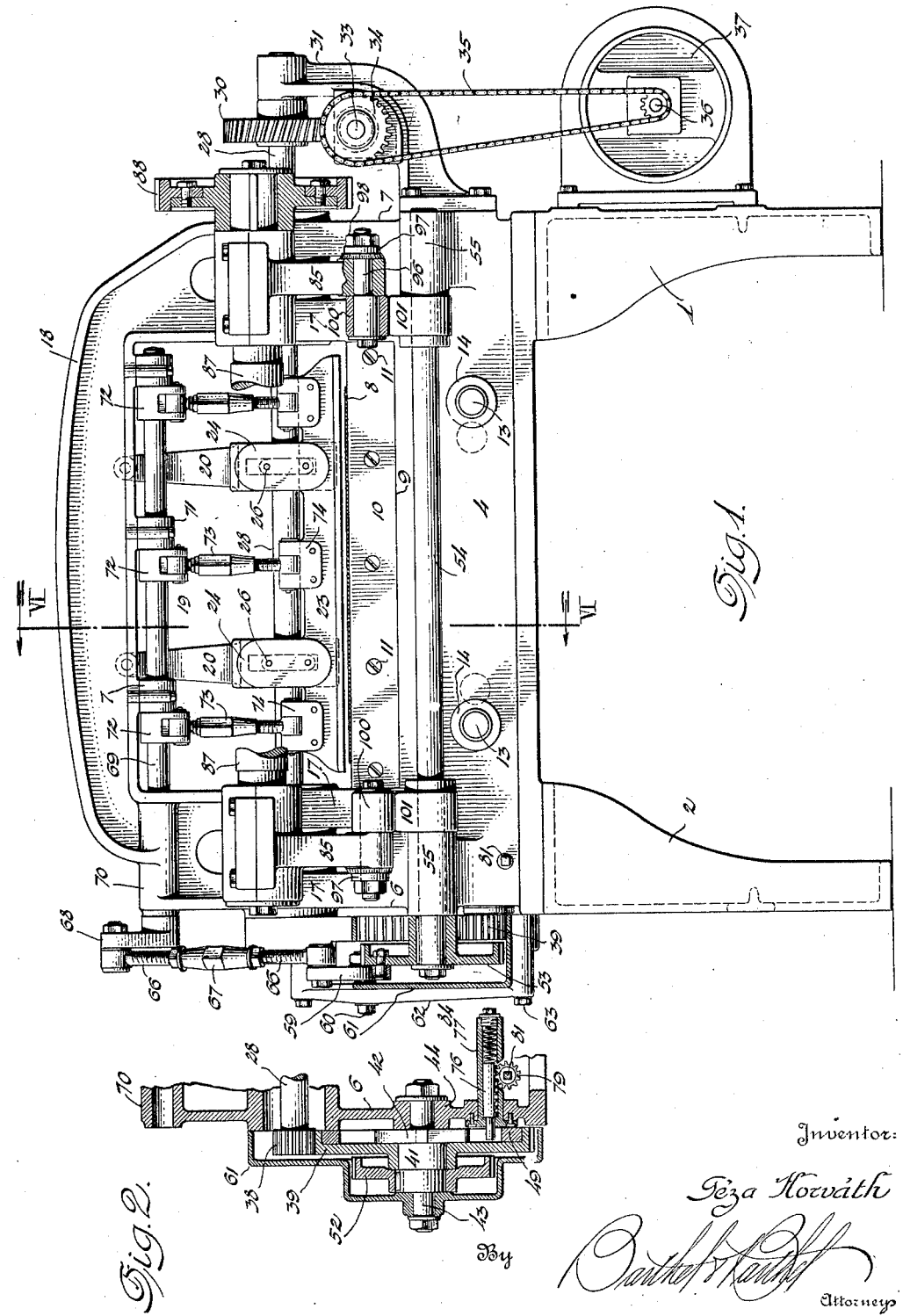

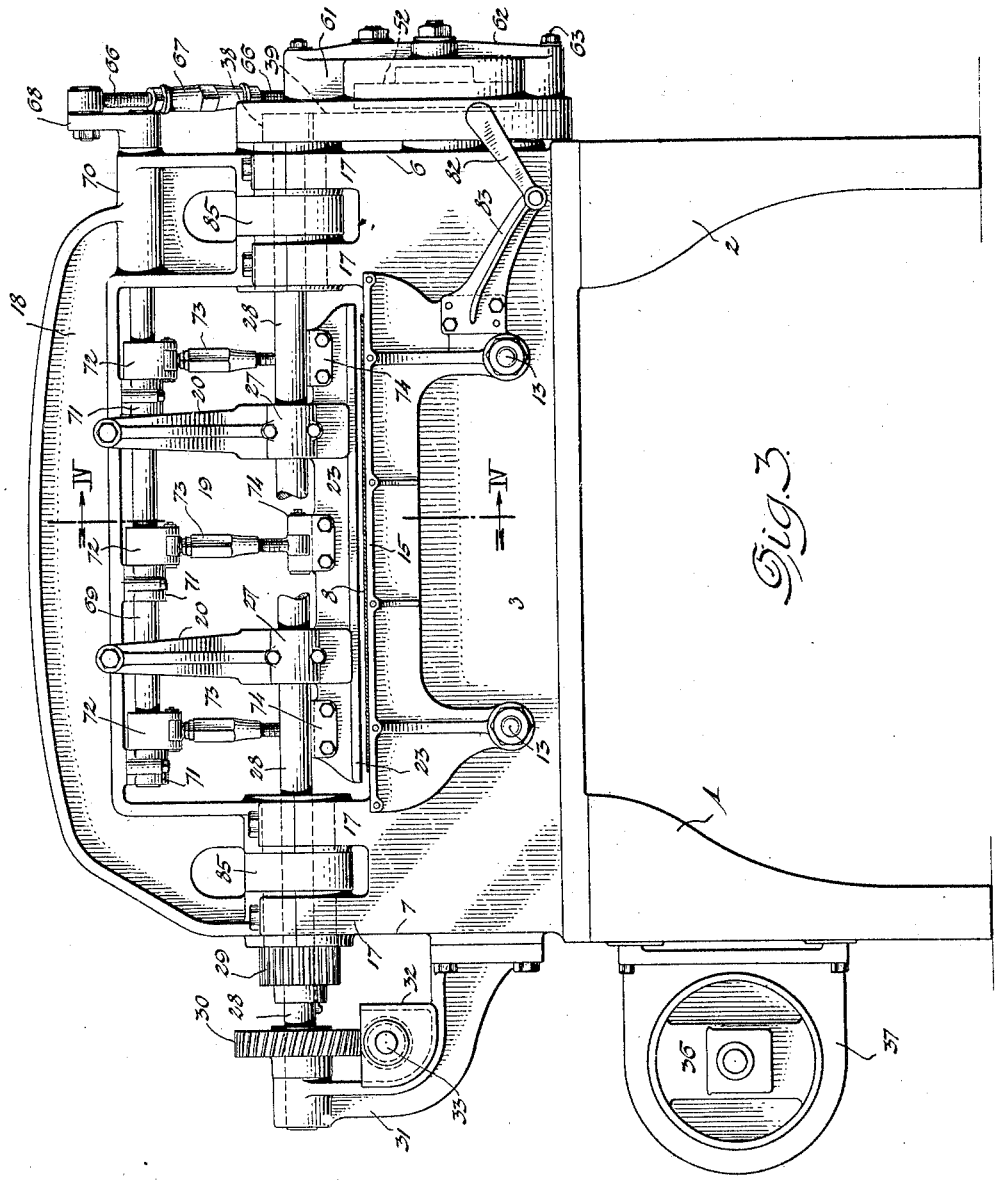
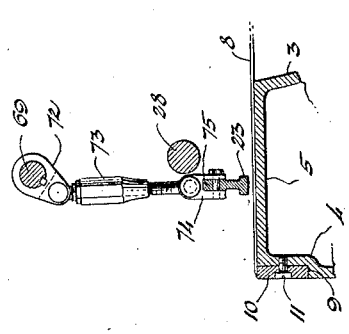

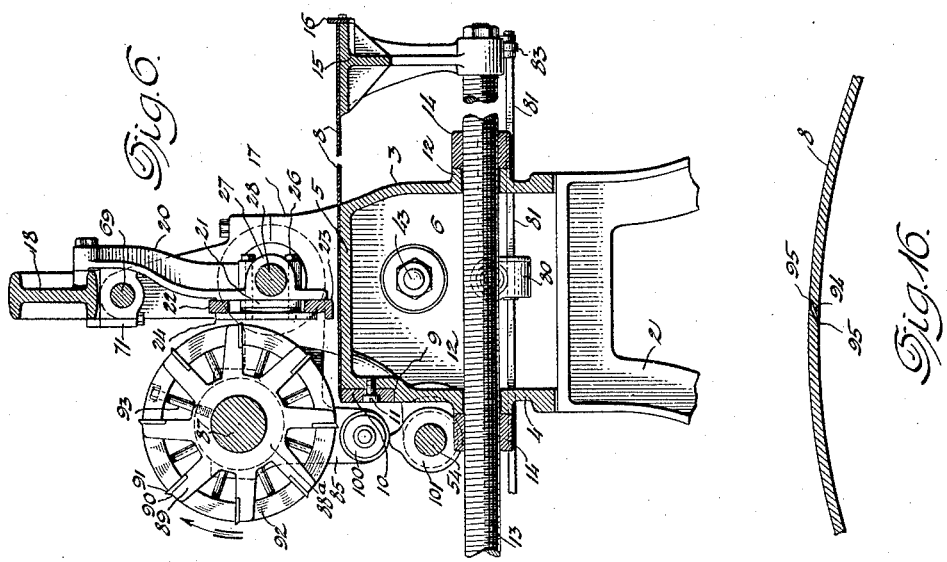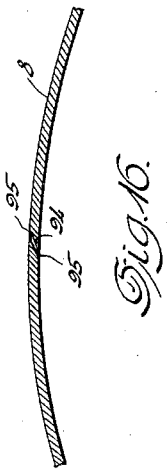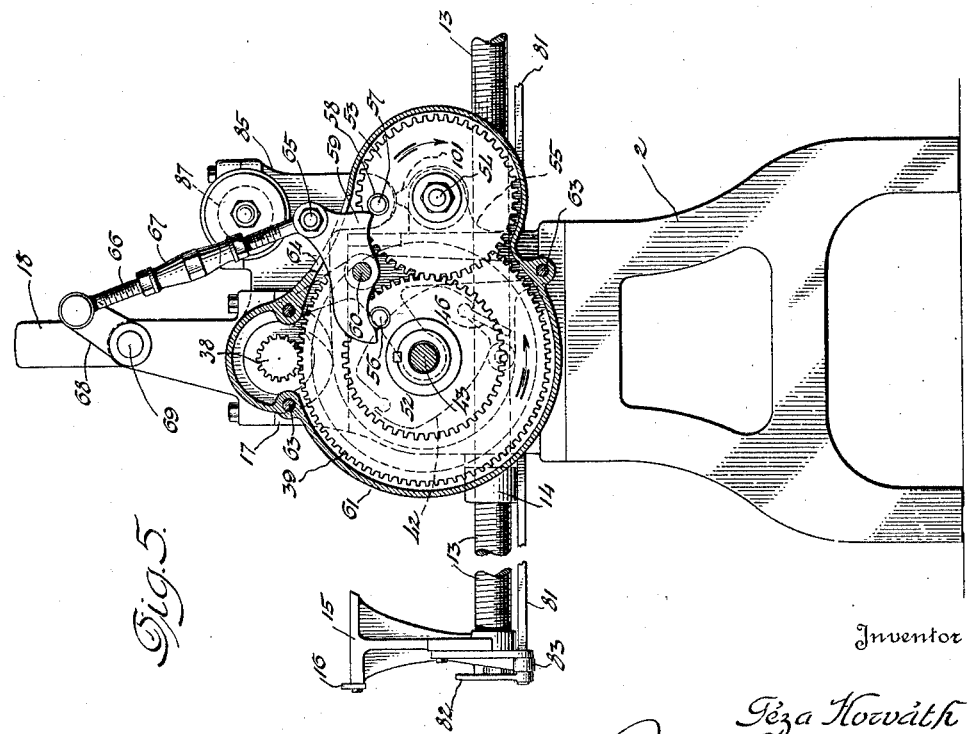

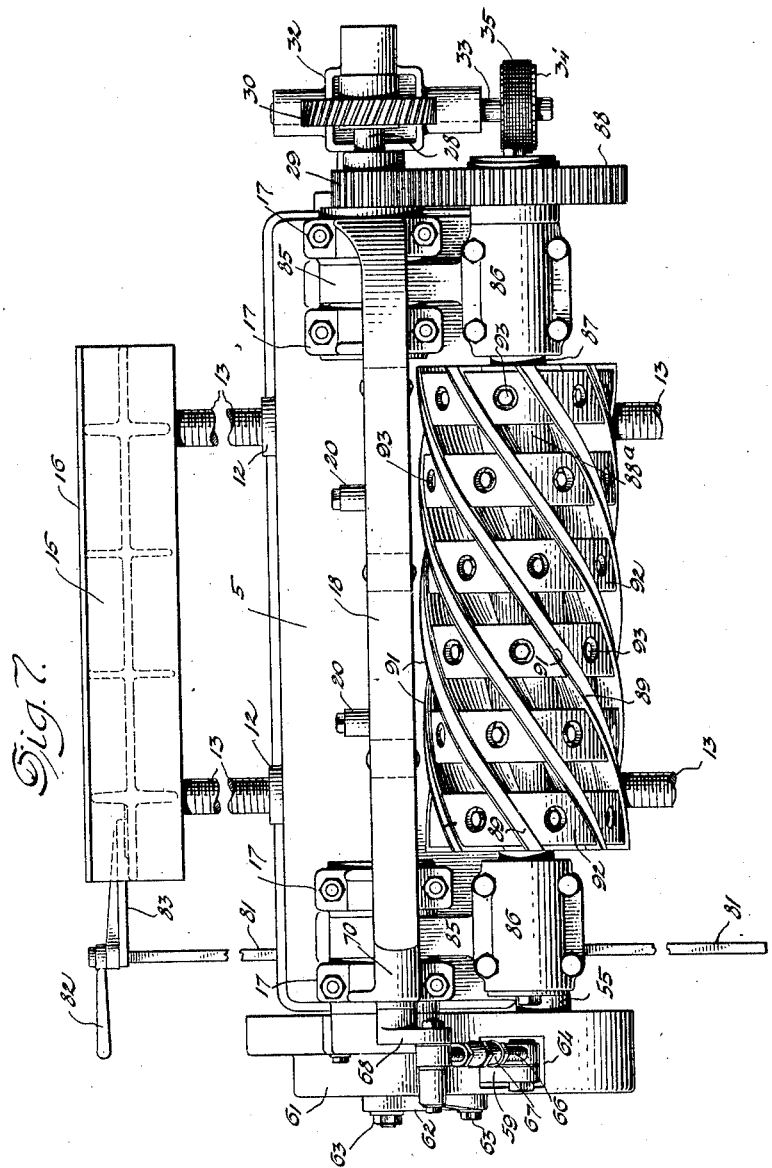

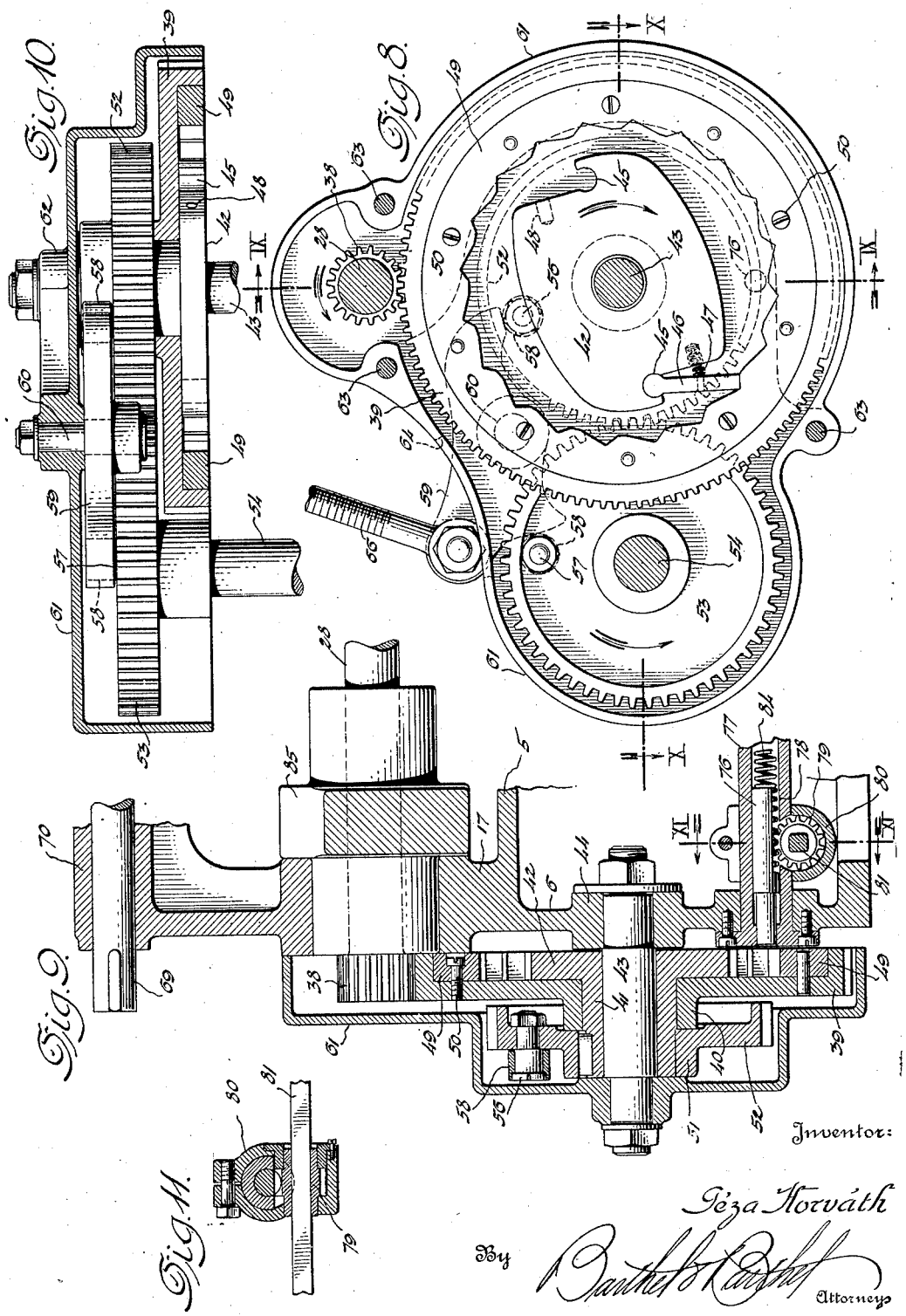

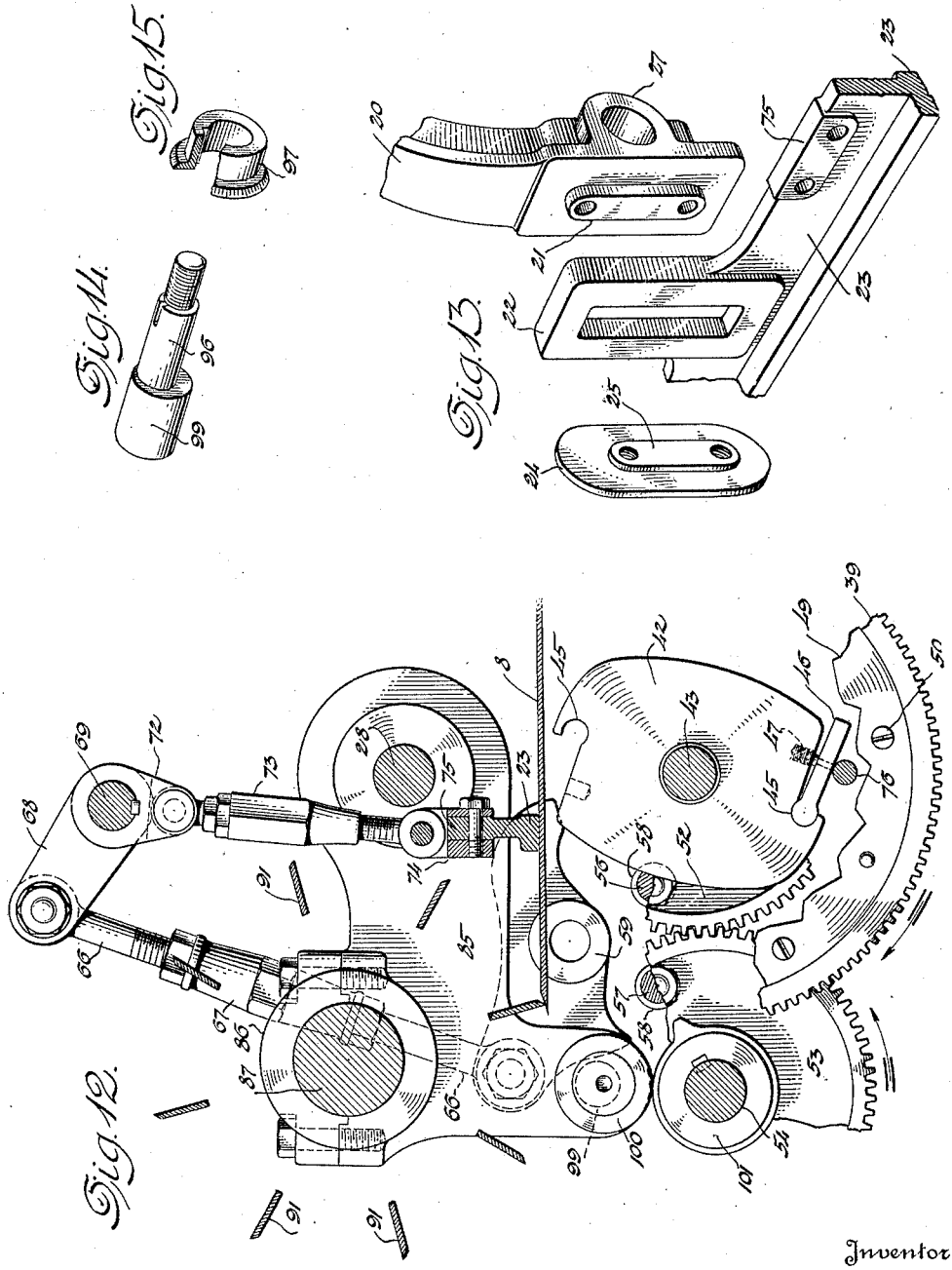

1,723,783

UNITED STATES PATENT OFFICE.

GEZA HORVATH, OF DETROIT, MICHIGAN.

BLANK-SCARFING MACHINE.

Application filed July 27, 1923. Serial No. 654,119.

In the manufacture of milk cans, ice cream containers and other large milk receptacles, metallic sheets are rolled or otherwise formed to provide a can or receptacle body shell and in order that the edges of the metallic sheet may be joined to form a tight durable seam, it is preferable to provide a metallic sheet with scarfed or beveled edges which may be placed in an adjoining relation and welded, brazed or otherwise connected to form a non-leakable connection just as though the cylindrical body or shell were drawn or integral throughout. The scarf joint formed by connecting the edges of the metallic sheet is in contradistinction to butt joints, lap joints or others producing seams that interrupt the cylindrical inner and outer surfaces of a receptacle body or shell.

My invention aims to provide a scarfing machine by which can or receptacle body blanks may be expeditiously and economically operated upon to bevel or scoop out edges of the blank, and a machine in accordance with my invention includes a novel clamping mechanism and gauge by which blanks of various sizes may be positively held during the scarfing operation. The machine also includes a rotary cutter and a novel operating mechanism by which the cutter is brought into operation in timed relation to the clamping mechanism, consequently there is no danger of a blank being operated upon unless firmly held in the machine.

My invention may be considered as including a machine body and an adjustable work gauge; a work clamping mechanism, an operating mechanism for the work clamp, and a rotary cutter. These organizations are combined into a machine that is compact, easy to control and highly efficient for the purposes for which it is intended. Each organization will be hereinafter specifically described under different captions and reference will now be had to the drawings, wherein Figure 1 is an elevation of the rear side of the machine;

Fig. 2 is a vertical cross sectional view of a portion of the clamp operating mechanism;

Fig. 3 is an elevation of the front side of the machine;

Fig. 4 is a vertical cross sectional view of a portion of the work clamping mechanism taken on the line IV—IV of Fig. 3;

Fig. 5 is an end view of the machine partly in section;

Fig. 6 is a vertical cross sectional view of the machine taken on the line VI—VI of Fig. 1;

Fig. 7 is a plan of the machine partly broken away;

Fig. 8 is an enlarged end view of the operating mechanism for the work clamp;

Fig. 9 is a longitudinal sectional view of the same taken on the line IX—IX of Fig. 8;

Fig. 10 is a horizontal sectional view of the same taken on the line X—X of Fig. 8;

Fig. 11 is a detail sectional view taken on the line XI—XI of Fig. 9;

Fig. 12 is a fragmentary sectional view of a portion of the machine illustrating the rotary cutter and clamp relative to a blank;

Fig. 13 is a perspective view of a portion of the clamp and a guide therefor,

Figs. 14 and 15 are perspective views of a roller adjusting device; and

Fig. 16 is a cross sectional view of a portion of a can showing the meeting edges of a blank prior to being united.

*Machine body and adjustable work gauge.*

(Figs. 1, 3, 6 and 7).

In the drawings, the reference numerals 1 and 2 denote end legs or supports for an oblong hollow machine body comprising a front wall 3, a rear wall 4, a top wall or table 5 and end walls 6 and 7. The top wall or table 5 is adapted to support a blank or sheet of metal 8 adapted to have an edge thereof sheared or cut at the rear edge of the table, and for this purpose the rear wall 4 is provided with a shoulder or seat 9 on which is mounted a wear plate 10 of more indurate metal than the body of the machine. The wear plate 10 may be held in place by screws 11 or other fastening means.

In order to properly position the blank 8 on the table 5 relative to the wear plate 10, an adjustable gauge is employed. The front and rear walls 3 and 4 of the machine body are provided with openings or bearings 12 for a set of feed screws 13 provided with nuts or collars 14 abutting the bearings 12 of the machine body. The front ends of the feed screws 13 are connected by an auxiliary table or support 15 which has its blank supporting surface in the same horizontal plane as the top of the table 5. Attached to the front edge of the auxiliary table 15 is a ledge strip 16 against which one edge of the blank 8 may be placed to properly position the opposite edge of the blank 8 relative to the wear plate 10. By adjusting the feed screws 13 the auxiliary table 15 may be shifted to and from the front wall of the machine body and thus permit of blanks of various sizes being placed on the tables to have edges of the blank scarfed and prepared for uniting when the blank is bent to cylindrical form or such configuration as will bring the scarfed edges of the blank together.

*Work clamp mechanism.*

(Figs. 1, 3, 4, 6, 12 and 13).

The machine body, at the ends of the table 5, is provided with sets of bearings 17 and mounted over said bearings and secured thereto is a longitudinally disposed throat member or bridge piece 18 co-operating with the table 5 in forming a window 19. Fixed to the front side of the throat member 18 are hangers 20 which extend into the window 19 and have the lower ends thereof provided with vertically disposed guides 21 for the rectangular frames 22 of a clamping bar or member 23 which is adapted to be lowered on to the blank 8 to firmly clamp said blank on the table 5 while being operated upon. The hanger guides 21 extend into the frames 22 and said frames are retained on the guides, against accidental displacement, by retaining plates 24 having guide portions 25 which meet the guides 21 within the frames 22. The guides 21 and 25 are connected by screws 26 or other fastening means. With the frames 22 of the clamp member slidable relative to the hangers 20, the clamp member can be raised and lowered relative to the blank 8 or the piece of work on the table 5, and the raising and lowering of the clamp member is preferably in timed relation to the cutting or shearing of the edge of the blank 8, so that said blank will be positively held before the rotary cutter of the machine is brought into operation. It is only necessary for the attendant of the machine to see that the blank is properly placed on the tables, then there will be no danger of the blank being displaced during the cutting or shearing operation.

*Operating mechanism for work clamp.*

(Figs. 2, 3, 5, and 8 to 12 inclusive).

Alining with the bearings 17 of the machine body are bearings 27 of the hangers 20 and journaled in the bearings 17 and 27 is a longitudinally disposed power shaft 28 which has one end thereof provided with a small gear wheel 29 and a worm wheel 30. This end of the power shaft protrudes beyond the wall 7 of the machine body and is additionally supported by a bracket 31 attached to the end wall 7 of the machine body. On the bracket 31 is a housing 32 for a worm 33 meshing with the worm wheel 30. One end of the worm 33 has a chain wheel 34 so that said worm may be driven by a chain 35 from the armature shaft 36 of an electric motor 37 at one end of the machine, said motor being preferably supported from the legs 1, as best shown in Figs. 1 and 3. It is obvious that the motor 37 may be located so that its armature shaft 36 may be directly coupled to the worm 33, or as a matter of fact any suitable source of power may be employed for driving the power shaft 28.

On that end of the power shaft 28, adjacent the end wall 6 of the machine body, a small gear wheel 38, meshing with a large gear wheel 39 having its hub portion 40 loose on the hub 41 of a pawl member 42 which is fixed on a stub shaft 43 mounted in a bearing 44 of the end wall 6. The pawl member 42 is somewhat like a double crank or cross head and has its end portions provided with sockets 45 for pivoted spring pressed pawls 46. Only one pawl is used at a time but two sockets are provided so that either may be used should it be necessary to renew a pawl. The pawl shown in Fig. 8 is held in a normally extended position by the expansive force of a spring 47 mounted in a pocket 48 of the pawl member 42. The outer end of the pawl 46 is adapted to engage a ratchet ring or member 49 mounted in the face of the large gear wheel 39 and retained therein by screws 50 or other fastening means.

Keyed or otherwise fixed on the hub portion 41 of the pawl member 42 is the hub 51 of a gear wheel 52 and said gear wheel meshes with another gear wheel 53 mounted on the end of a longitudinally disposed shaft 54, journaled in bearings 55, carried by the rear wall 4 of the machine body. See Fig. 1.

On the outer faces of the gear wheels 52 and 53 are wrist pins 56 and 57 provided with anti-frictional rollers 58 and these rollers are adapted to engage and actuate a rocker member 59 on a stub shaft 60 carried by a casing 61 fastened to the end wall 6 of the machine body. The casing 61 may have a spider frame 62 attached to the end wall 6 by bolts 63 or other fastening means. As shown in Fig. 8 the casing 61 is of such configuration as to enclose the gear wheels 38, 39, 52, 53 and associated parts.

The rocker member 59 extends through an opening 64 in the casing 61 and is pivotally connected, as at 65 to an extensible rod 66 which may be provided with a turn buckle or other adjustable device 67 by

General operation.

I will assume that the power shaft 28 is being driven and that the auxiliary table 15 is properly set so that when the blank 8 is placed on the main table 5 the edge of the blank will be presented at the wear plate 10 to be trimmed or cut to provide the blank with a beveled or concaved edge.

The power shaft 28 drives the large gear wheel 39 and as this gear wheel revolves in a clockwise direction, viewing Fig. 8, it rotates the pawl member 42 by virtue of the pawl 46 engaging the ratchet ring 49. With the pawl member 42 rotating in a clockwise direction, as indicated by arrow on Fig. 8, the shaft 43 is driven, the gear wheel 52 thereon, and the gear wheel 53 of the shaft 54. As this shaft 54 is provided with cams 101 it is obvious that the tiltable members 85 will be tilted to raise and lower the rotary cutter relative to the blank. During such movement of the tiltable members 85 the rotary cutter is driven from the power shaft 28 through the gear wheels 29 and 88.

As the gear wheels 52 and 53 are revolved the anti-frictional rollers of the wrist pins 56 and 57 engage the rocker member 59 causing said member to rock the shaft 69 and raise and lower the clamping bar or member 23 relative to the blank 8. The constructive arrangement of parts is such that the action of the clamp mechanism is timed to firmly hold the blank on the table while the rotary cutter is shifted into and out of engagement with the edge of the blank. The blank is clamped throughout its width so that it cannot be dragged over the table 5 during the action of the rotary cutter, and immediately upon the edge of the blank having been operated upon and the rotary cutter raised the blank 8 is released by the clamp member 23 and another blank may be placed in position or the blank reversed in order that its opposite edge may be cut.

As the large gear wheel 39 is driven in a clockwise direction, carrying with it the pawl member 42, the pawl 46 of said member eventually impinges against the plunger 76 and said pawl rides over the plunger and is raised out from engagement with the ratchet ring 49. As this ring is carried by the driven gear wheel 39, the application of power to the shaft 43 ceases and consequently the tiltable members 85 are not actuated nor is the clamping bar or member 23. The pawl 46 is of sufficient length to rest on the plunger 76 without any overrunning action of the pawl member 42, and this will be the condition of the machine as long as the pawl 46 is retracted. It is during such interim that an attendant of the machine may remove a blank, reverse it, or substitute another blank therefor. It then becomes necessary for the attendant of the machine, after properly placing the blank, to shift the handle or crank 82 which rocks the rod 81 and causes the rack and pinion to retract the plunger 76. When this plunger is retracted the pawl 46 immediately engages the driven ratchet ring 49 and the machine is placed in action to cut the edge of the blank.

The attendant of the machine may strike the lever 82 and cause the plunger 76 to be retracted to release the pawl 46, but when the handle or crank 82 is released or recovers from a blow the plunger 76 assumes an extended position to again be within the path of the pawl 46 and cause a cessation in the operation of the clamping mechanism as well as the tilting action of the rotary cutter at a proper time.

With the rotary cutter constantly driven its active position is under the control of the machine attendant, and since the clamping mechanism is automatically actuated, in timed relation to the action of the rotary cutter, there can be no cutting action unless the blank is properly clamped on the table. This is a safety factor in connection with the machine and since the rotary cutter is at the rear side of the machine an attendant can safely manipulate blanks at the front side of the machine.

It is thought that the operation and utility of my machine will be apparent without further description, and while in the drawings, there is illustrated a preferred embodment of my invention, it is to be understood that the structural elements are susceptible to such variations and modifications as fall within the scope of the appended claims.

What I claim is:—

1. A machine for cutting edges of a metallic blank preparatory to forming a body having a scarf-joint, said machine comprising a table on which the blank is placed, a tiltably supported driven rotary cutter adapted to operate on the blank on said table, clamping means adapted to hold the blank on the table, a set of meshing gears, cutter tilting means operated by one of said gears and adapted to intermittently actuate said tiltable members, clamp actuating means adapted to be operated by said gears to intermittently actuate said clamping means, a pawl member driven in synchronism with said driven rotary cutter, a pawl carried by said pawl member and engageable with one of said meshing gears to drive said gears, and manually controlled means operatable in the path of said pawl to control the driving of said gears so as to time the tilting of said cutter relative to said clamping means.

2. A machine as called for in claim 1, wherein said cutter tilting means includes which the rod 66 may have its longitudinal dimension increased or decreased to regulate the stroke or action of a member actuated by said rod. The upper end of the rod 66 is pivotally connected to a crank 68 on a longitudinal rock shaft 69, journaled in a bearing 70 at one end of the throat member 18 and bearings 71 in the window 19 of said throat member. On the rock shaft 69, at each of the bearings 71, is a crank 72 and said cranks are pivotally connected to the upper ends of extensible rods 73 which have the lower ends thereof pivotally connected to stirrups 74 attached to the upper edge of the clamp bar or member 23. This clamp bar or member 23 has enlarged apertured portions 75 to receive the stirrups. See Figs. 12 and 13.

The pawl 46 is adapted to establish a driving relation between the ratchet ring 49 and the pawl member 42, but at times such driving relation is interrupted by the pawl 46 being lifted out of engagement with the ratchet ring 49. Such disconnection is accomplished by the reduced end of a spring pressed plunger 76 mounted in a casing 77 supported from the end wall 6 of the machine body. The plunger 76 is formed with a rack 78 meshing with a pinion 79 journaled in a housing 80 clamped about a casing 77. Sliding through the pinion 79 is a rod 81, other than cylindrical in cross section, said rod also sliding in openings provided therefor in the walls 3 and 4 of the machine body. The front end of the rod has a crank or handle 82 with the hub portion of said crank journaled in a bracket 83 carried by the auxiliary table 15. If the auxiliary table 15 is adjusted relative to the front wall 3 the rod 81 slides in the pinion 79, but at all times maintains an operative relation with the pinion 79 so that the plunger 76 may be retracted against the action of an expansive spring 84 mounted in the casing 77. The plunger may be manually retracted but is normally held in an extended position with its reduced end in the path of the pawl 46 to raise said pawl from engagement with the ratchet ring 49.

*Rotary cutter.*

(Figs. 6, 7 and 12).

Loose on the power shaft 28, between the bearings 17 of the machine body, are the front ends of tiltable members 85 provided with bearings 86 for a cutter shaft 87. At one end of said cutter shaft is a large gear wheel 88 meshing with the small gear wheel 29 of the power shaft 28, said gear wheels constantly meshing even though the members 85 are tilted or adjusted relative to said power shaft.

Fixed on the cutter shaft 87 is the hub portion 88ª of a cutter body having spiral ribs or holders 89 extending throughout the length thereof and provided with seats 90 for spiral blades 91 which are retained in place by interposed segment shaped blocks 92 attached to the hub portion 88 of the rotary cutter by screw bolts 93. The blocks 92 brace the blades 91 and during the cutting action of said blades they are backed up by the spiral ribs or supports 89 forming the cutter body. The blades 91 are somewhat similar to the blades of a lawn mower and will have a shearing action against the edge of the blank 8 on the wear plate 10, said blades scooping out the blank so as to leave a beveled edge 94 that is somewhat concave. When two such edges are brought together, as shown in Fig. 16, a small space exists between such edges and this space is conducive to proper welding of the two edges. Each edge of the blank when properly cut or scooped out will present two contacting edges 95, not contacting with each other but adapted to contact with similar edges at the opposite edge or end of the blank, when said blank is formed to provide a can or receptacle body. When welding irons or electrodes are brought to bear on the adjoining edges of the blank the metal is sufficiently upset to positively unite the contacting edges of the blank and the space 94 between such edges is wiped out by the upsetting of the metal and a very intimate, if not integral, relation established between the edges of the blank.

The spiral cutting blades 91 prevent the formation of fins or ragged edges on the blank, since there can be no tearing or sudden cutting action as though the full width of the blank were cut at one time. With a cutting blade starting in at one side of the blank it will gradually cut to the opposite side thereof and cooperating therewith will be adjacent blades all contributing to a clean and uniformly cut edge, two of which may form a perfect scarf joint.

The rotary cutter is adapted to be raised and lowered relative to the wear plate 10 of the table 5. For this purpose the tiltable members 85 are provided with adjustable shafts or rotary members 96 and on the outer ends of said shafts or members are micrometer gauges 97 and clamping nuts 98. On the inner ends of said shafts or members are eccentric heads 99 provided with anti-frictional rollers 100 and these rollers normally engage cams 101 on the shaft 54. By turning the shafts or members 96 and locking the same in adjusted positions the tilting action of the rotary cutter may be regulated. As the cutting blades 91 are worn the anti-frictional rollers 100 may be adjusted to lower the rotary cutter relative to the table and thus insure proper action of the cutting blades relative to the blank 8.

a shaft supporting one of said gear wheels and driven thereby, and a cam on said shaft to effect tilting of the tiltable members of said cutter.

3. A machine as called for in claim 1, wherein said clamp actuating means includes a rocker member articulated with a blank clamping member.

4. A machine as called for in claim 1, wherein said manually controlled means includes a normally distended plunger, and rack and pinions for retracting said plunger.

5. In a machine for cutting the edge of a blank wherein the blank is held stationary while a cutter is moved into and out of engagement with the blank, blank holding means, said means comprising a reciprocable member brought down into engagement with the blank, a rock shaft adapted to reciprocate said member, a rock member adapted to rock said rock shaft, meshing gear wheels adapted to actuate said rocker member, and driven means housed within one of said gear wheels adapted to intermittently operate said gear wheels.

6. A machine as called for in claim 5, wherein said driven means includes a ratchet member within the gear wheel, a driven pawl member, and a pawl carried by said member adapted to be moved into and out of engagement with said ratchet member.

In testimony whereof I affix my signature.

GEZA HORVATH.